United States Patent
Rivera

[11] Patent Number: 5,842,304
[45] Date of Patent: Dec. 1, 1998

[54] FOLDABLE CRAB TRAP HAVING A BAIT BAG

[75] Inventor: Raymond Rivera, Perth Amboy, N.J.

[73] Assignee: Jorge Santiago, Perth Amboy, N.J.; a part interest

[21] Appl. No.: 642,860

[22] Filed: May 6, 1996

[51] Int. Cl.$^6$ ................................................. A01K 69/10
[52] U.S. Cl. .................................................................. 43/105
[58] Field of Search ............................ 43/100, 102, 103, 43/104, 105

[56] References Cited

U.S. PATENT DOCUMENTS

| | | | |
|---|---|---|---|
| 113,292 | 4/1871 | Hammond | 43/105 |
| 237,231 | 2/1881 | Atkinson | 43/105 |
| 424,548 | 4/1890 | Franklin | 43/105 |
| 708,380 | 9/1902 | Merle | 43/105 |
| 1,262,507 | 4/1918 | Johnston | 43/105 |
| 3,553,881 | 1/1971 | Hasseman | 43/105 |
| 3,867,782 | 2/1975 | Ortiz | 43/105 |
| 3,903,637 | 9/1975 | Dorsey | 43/105 |
| 3,939,597 | 2/1976 | McSherry | 43/105 |
| 4,050,182 | 9/1977 | Basile | 43/105 |
| 4,141,172 | 2/1979 | Prosol | 43/105 |
| 4,479,325 | 10/1984 | Jakimas | 43/105 |
| 4,654,997 | 4/1987 | Ponzo | 43/105 |

FOREIGN PATENT DOCUMENTS

| | | | |
|---|---|---|---|
| 581407 | 8/1958 | Italy | 43/105 |
| 14409 | 10/1888 | United Kingdom | 43/105 |
| 2150801 | 7/1985 | United Kingdom | 43/105 |

*Primary Examiner*—Kurt Rowan
*Attorney, Agent, or Firm*—Ezra Sutton

[57] ABSTRACT

A foldable crab trap for catching crabs which includes a central hinge member, a central frame member connected to the central hinge member, and a pair of outer frame members each having crab nets. The outer frame members are movable relative to the central hinge member between an open position wherein the outer frame members are in the same plane for receiving crabs, and a closed position wherein the outer frame member are parallel to each other for trapping crabs. A tension line is connected to the outer ends of the outer frame members and to the outer end of the central frame member for moving the outer frame members to the closed position. The tension line has a free end adapted to be held under tension by the crab catcher for signalling the crab catcher when a crab is present in the crab trap. A bait bag containing bait is connected under tension to the central frame member so that when a crab nibbles on the bait it causes movement of the central frame member and movement of the tension line to signal the crab catcher that a crab is present in the crab trap, and so that the crab catcher may pull on the tension line for moving the outer frame members to the closed position and for lifting the crab trap out of the water.

16 Claims, 4 Drawing Sheets

FOLDABLE CRAB TRAP HAVING A BAIT BAG

FIELD OF THE INVENTION

This invention relates to a foldable, crab trap and, more particularly, to a crab trap which has a bait bag mounted under tension for easy access to supply bait and for indicating when a crab is nibbling on the bait.

BACKGROUND OF THE INVENTION

Traps for crabs, lobsters, prawns, shrimp and other crustaceans have been extensively used in the past for snaring these types of sea creatures for sporting or commercial needs. Crabbing, in general, is either a passive or assertive activity, depending upon the type of trap used. Most passive crab traps have a rigid structure, e.g. box-type crabbing assemblies where the housing component is formed with collapsible doors or walls. During use, there is no assurance that a crab has been captured after eating the bait in the trap, as the crab has ingress and egress from the trap. In addition, the user has no way of knowing when a crab is in the trap, because of the weight of the trap, and there is no way the trap can signal that a crab is present.

Most active crab traps are of a light-weight, foldable configuration, e.g. the housing component is formed with two foldable frames having a center hinge like a book. During use, there is no way of knowing that a crab is present and is eating the bait in the trap because the crab trap line is not under tension. This is in contrast to fishing where the fishing line is under tension and it is noticeable when the fish takes the bait by the movement of the fishing line. Also, there is no way the crab trap can signal that a crab is present. The user of this type of trap must constantly bring-up the trap to ascertain if any crabs have been caught in the trap.

There remains a need for a foldable crab trap having a bait bag which provides a signalling means for indicating that a crab has entered the trap and is nibbling on the bait within the bait bag. With such an arrangement, the user then can immediately fold and pull-up the crab trap to ensnare the crab while the crab is eating the bait and is still in the trap.

DESCRIPTION OF THE PRIOR ART

Foldable crab traps for crabbing having various designs, functions, and materials of construction have been disclosed in the prior art. For example, U.S. Pat. Nos. 3,786,593 and 4,050,182 both disclose crab traps having a frame enclosed by a box-like net. Both traps have latching devices to hold the frame open. Neither crab trap discloses a bait bag being mounted in the frame under tension for signalling that a crab is present in the trap, as in the present invention.

U.S. Pat. No. 4,594,804 discloses a crab trap having a clam shell-type frame having a net attached thereto. The crab trap has a latching device to hold the frame members open. This crab trap does not disclose means for signalling that a crab is present in the trap.

U.S. Pat. No. 4,479,325 discloses a foldable crab trap having wire mesh outer walls hingedly mounted to a center wall. In an alternate embodiment, the crab trap has a bait basket disposed on the center wall. This crab trap does not disclose means for signalling that a crab is present in the trap, as in the present invention.

Accordingly, it is an object of the present invention to provide a foldable crab trap having a bait bag which in an operational mode includes a simple and direct signalling device for indicating when a crab has entered the trap and is eating the bait so the user can immediately close the trap and pull it up.

Another object of the present invention is to provide a foldable crab trap having a bait bag mounted on a frame under tension which provides the signalling device for indicating that a crab has entered the trap and is nibbling on the bait.

Another object of the present invention is to provide a foldable crab trap that is easily folded and collapsed for transport and storage, and having no loose pieces in its collapsed state.

A further object of the present invention is to provide a foldable crab trap that can be moved to an operational mode from a folded state to an open state by simply unfolding the outer frame members and inserting bait in the bait bag.

A still further object of the present invention is to provide a foldable crab trap having a bait bag that can be mass produced in an automated and economical manner; and is readily affordable to the user.

SUMMARY OF THE INVENTION

The present invention provides a foldable crab trap for catching crabs and includes a central hinge member, a central frame member connected to the central hinge member, and a pair of outer frame members each having crab nets. The outer frame members are movable relative to the central hinge member between an open position wherein the outer frame members are in the same plane for receiving crabs, and a closed position wherein the outer frame member are parallel to each other for trapping crabs. A tension line is connected to the outer ends of the outer frame members and to the outer end of the central frame member for moving the outer frame members to the closed position. The tension line has a free end adapted to be held under tension by the crab catcher for signalling the crab catcher when a crab is present in the crab trap. A bait bag containing bait is connected under tension to the central frame member so that when a crab nibbles on the bait it causes movement of the central frame member and movement of the tension line to signal the crab catcher that a crab is present in the crab trap, and so that the crab catcher may pull on the tension line for moving the outer frame members to the closed position and for lifting the crab trap out of the water.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

The preferred embodiment of the present invention provides a foldable crab trap 10, as represented in FIGS. 1 to 4.

Figure 1:
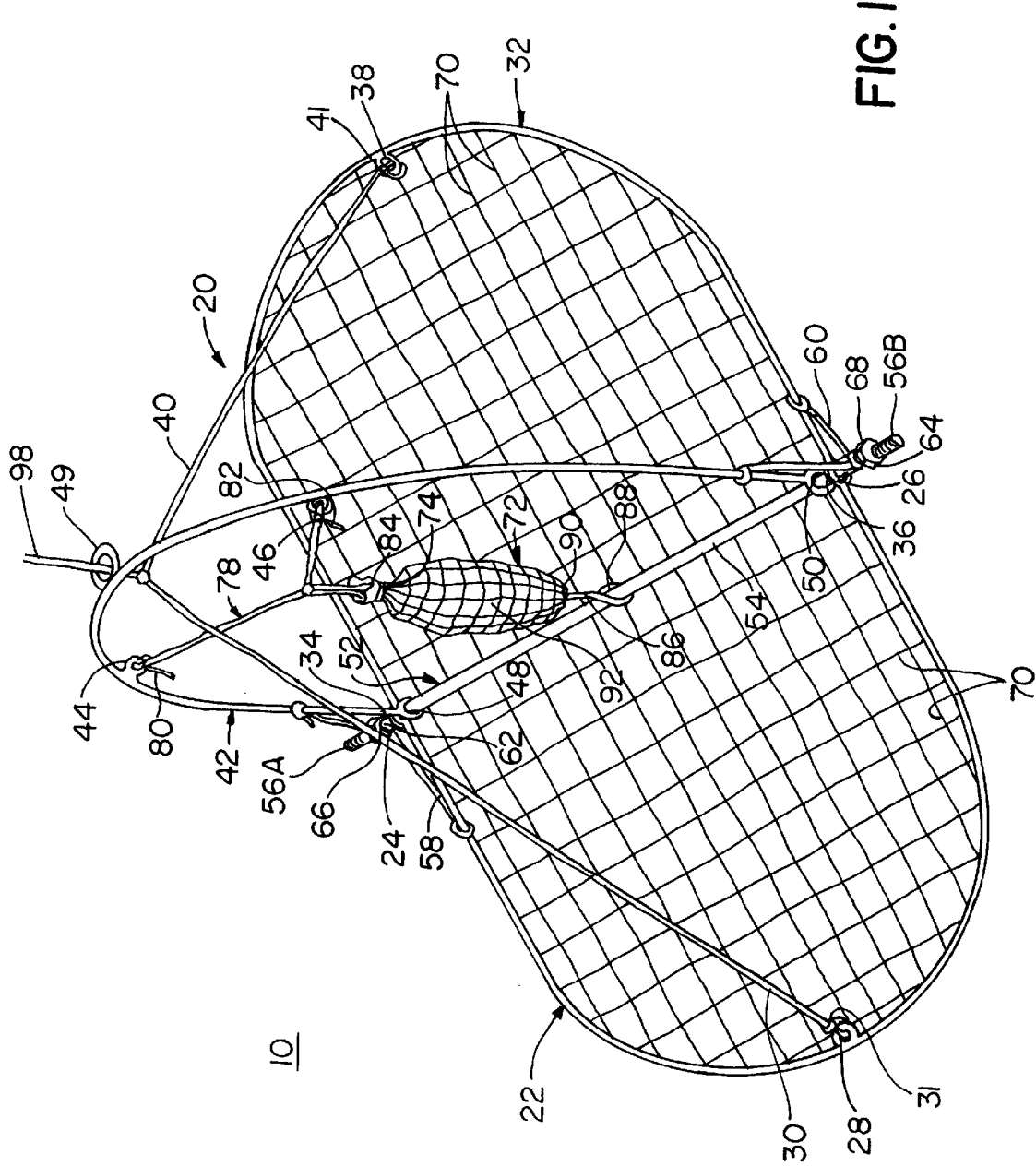
FIG. 1 is a perspective view of the foldable crab trap of the present invention shown in an open position and ready to catch crabs.
Figure 2:
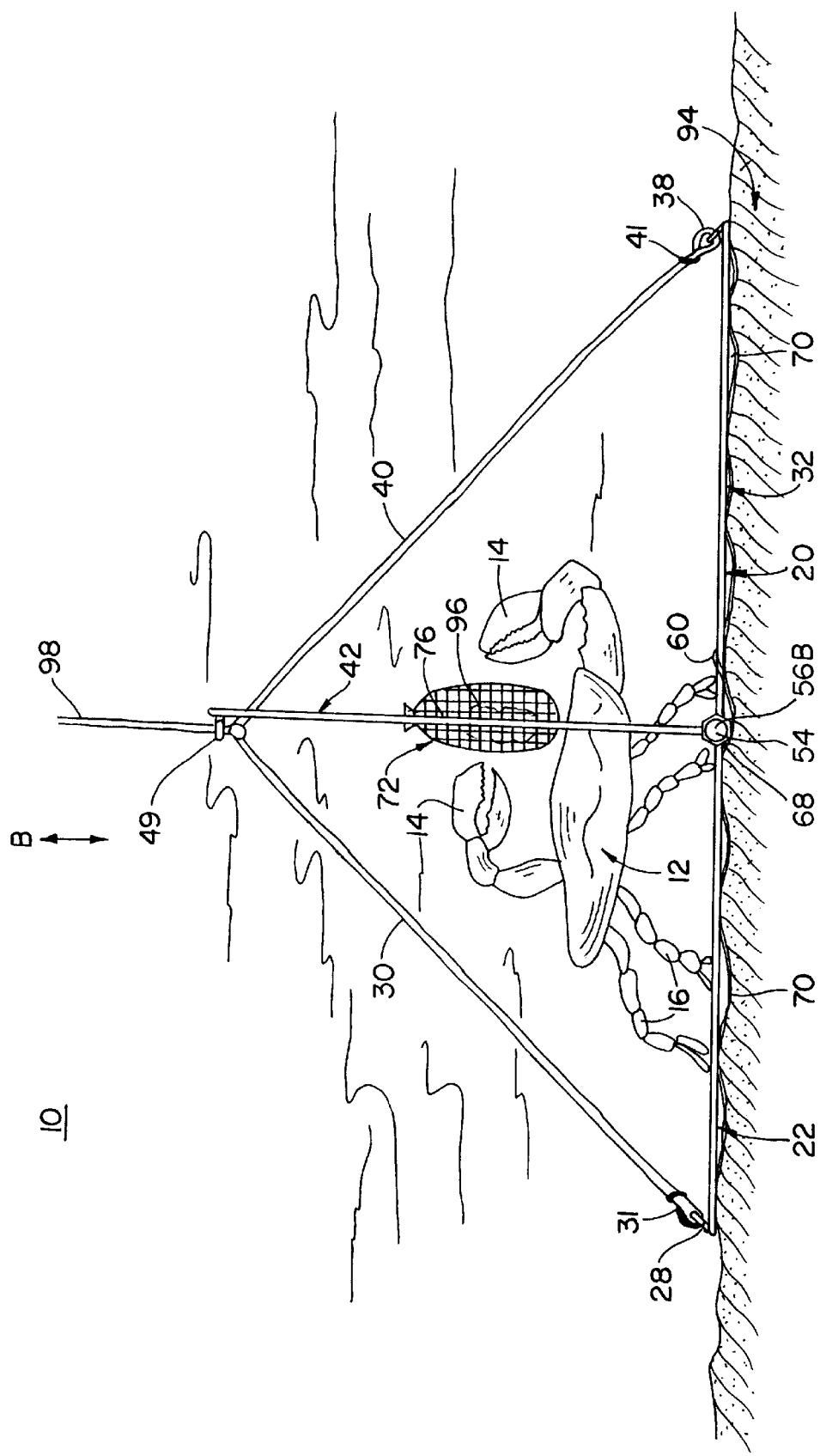
FIG. 2 is a side elevational view of the foldable crab trap of the present invention showing a crab in the trap and nibbling on the bait bag.

FIGS. 1 and 2 show the crab trap 10 in an opened state; and in an operational mode for trapping a crab 12 with the use of a bait bag 72 mounted under tension. The crab trap 10 includes a housing 20 having a pair of U-shaped, outer frame members 22 and 32, a U-shaped central frame member 42, a center hinge 52, a main crab net 70, and a bait bag 72. Frame members 22, 32, and 42 and center hinge 52 are made of a corrosion-resistant metal or plastic for salt-water use. Crab net 70 and bait bag 72 are made from fabric materials such as nylon, cotton, hemp, polyester, rayon and the like.

The left outer frame member 22 includes a pair of attachment loops 24 and 26 for pivotally attaching it to center hinge 52, and a center tension loop 28 for connecting a left side tension support line 30. The right outer frame member 32 includes a pair of attachment loops 34 and 36 for pivotally attaching it to center hinge 52, and a center tension loop 38 for connecting a right side tension support line 40. Main crab net 70 is attached to both outer frame members 22 and 32, as shown in FIG. 1 of the drawings.

The central frame member 42 includes a pair of attachment loops 48 and 50 for pivotally attaching it to center hinge 52, and a center tension loop 49 for connection to tension support lines 30 and 40. In addition, central frame member 42 also includes a pair of bat tension loops 44 and 46 for keeping bait bag 72 under tension.

Center hinge 52 includes a straight cylindrical metal bar 54 with threaded ends 56A and 56B having hinge springs 58 and 60, locking washers 62 and 64, and locking nuts attached thereon for pivotally mounting thereon frame members 22, 32, and 42. Hinge springs 58 and 60 hold frame members 22 and 32 in an open position and in the same plane when crab trap 10 is in an operational mode.

Bait bag 72, as shown in FIG. 1, includes a neck draw string 74 for enclosing bait 96 within the bait bag interior chamber 76. Bait bag 72 is mounted under tension by a generally "Y"-shaped upper tension line 78 made of nylon and a lower metal tension wire 86 having attachment loops 88 and 90. The "Y"-shaped upper tension line 78 consists of two upper tying sections 80 and 82 for attachment to tension loops 44 and 46, and a lower tying section 84 for attachment to bait bag 72. Other forms of a bait bag 72 can be used for crab trap 10, such as a bait pouch, a collapsible bait cage, a bait frame and the like.

The lower attachment loop 88 of tension wire 86 is connected to hinge bar 54, and the upper attachment loop 90 is connected to the bottom area 92 of bait bag 72. In this manner, bait bag 72 is mounted under tension, such that when a crab 12 enters crab trap 10 and nibbles on bait bag 72 for bait 96, the user feels movement on the main fishing line 98 and is signalled to close and lift the trap 10.

Although the present application refers to crabs, it should be understood that this is by way of example only, and it is intended that this application includes other crustaceans, including but not limited to lobsters, prawns, shrimp, eels, crayfish, etc.

OPERATION OF THE PRESENT INVENTION

Figure 3:
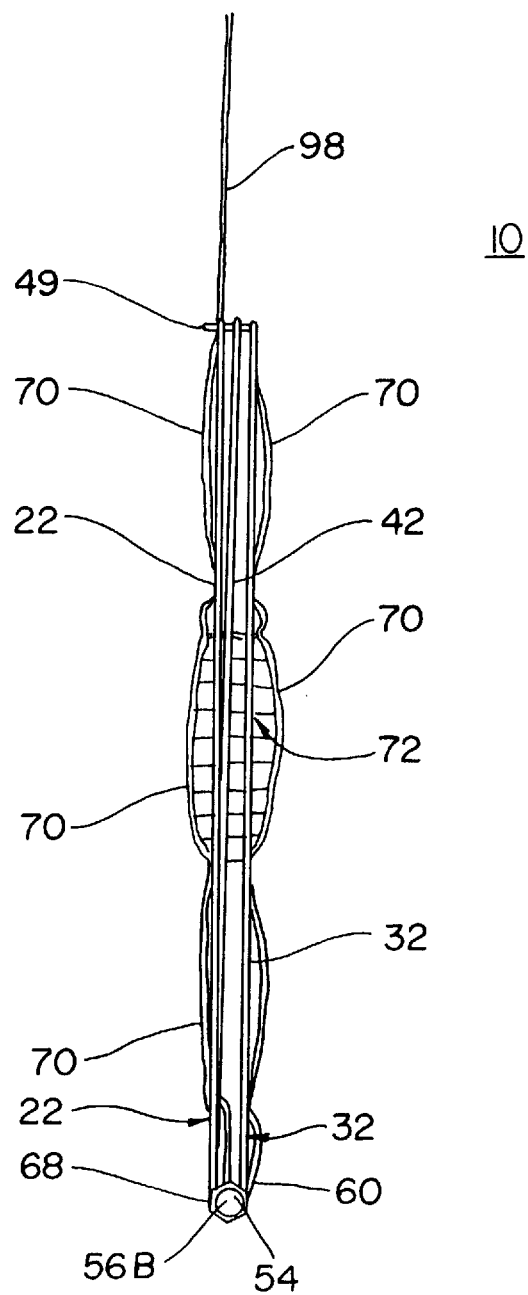
FIG. 3 is a perspective view of the foldable crab trap of the present invention shown in a closed position.
Figure 4:
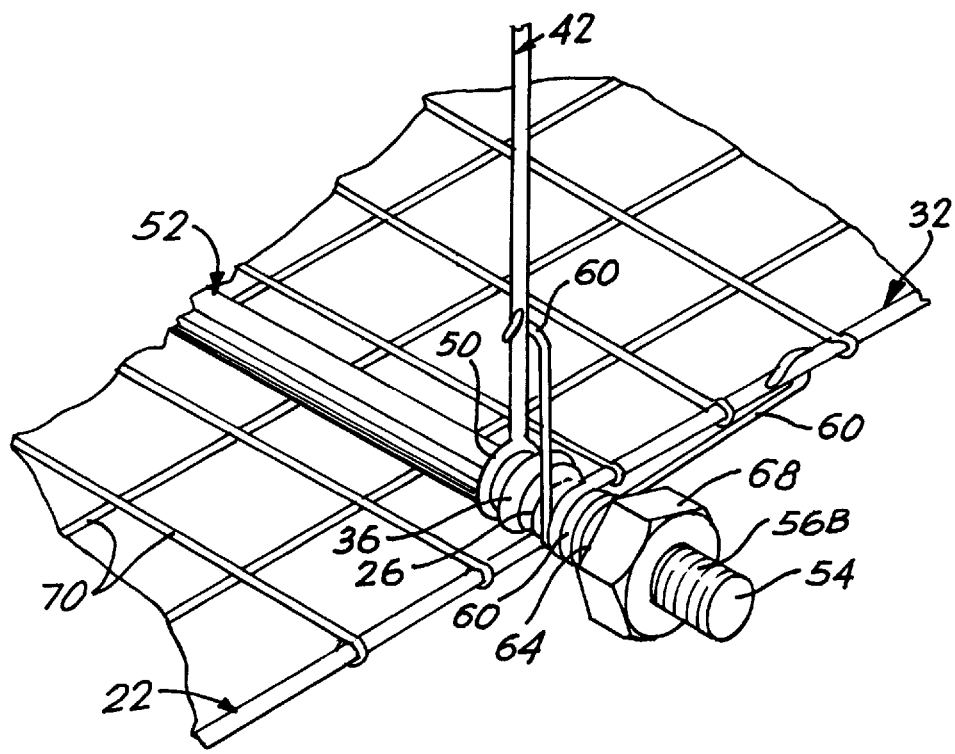
FIG. 4 is an enlarged and partial perspective view of the foldable crab trap of the present invention showing the center hinge member connected to the central frame member and the outer frame members.

When taking the crab trap 10 out of its closed or collapsed configuration, as shown in FIG. 3 of the drawings, the crab trap 10 can be opened, as shown in FIGS. 1 and 2, by simply opening the hinge springs 58 and 60 on center hinge 52 to an open position, such that outer frame members 22 and 32 are in a horizontal plane relative to each other. Bait 96 now can be put into the interior chamber area 76 of bait bag 72 and draw string 74 is pulled tightly to close the neck of bait bag 72 to lock-in the bait 96 within bait bag 72.

The user then checks visually to see that the bait bag 72 is mounted under proper tension within center frame 42. If necessary, the user can tighten-up on the tying sections 80 and 82 of upper tension line 78 within each tension loop 44 and 46 of central frame 42 to create a proper tension for bait bag 72. Alternately, the user can tighten-up on the lower tying section 84 of upper tension line 78 within bait bag 72 to create a proper tension for bait bag 72, as shown in FIG. 1. The nylon tension lines 30 and 40 are also checked visually by the user for proper tension to the outer frames 22 and 32 of crab trap 10 when in the assembled state. If necessary, the user can tighten-up on the tying ends 31 and 41 of tension lines 30 and 40 via the attachment loop 49 of central frame 42 within each tension adjustment loop 28 and 38 of outer frames 22 and 32, as shown in FIGS. 1 and 2 of the drawings, to create a proper tension for outer frame members 22 and 32. Crab trap 10 is then tied to the main fishing line 98 via the attachment loop 49 on center frame 42.

The crab trap 10 is now operational and ready for crabbing. The crab trap 10 is lowered into place in the water to the ocean bed 94 by the main fishing line 98, as shown in FIGS. 1 and 2. The outer frame members 22 and 32 having the main crab net 70 are in a horizontal plane with the ocean bed 94, which provides easy access for the crabs 12 to enter the crab trap 10 and feed on the bait 96 within the bait bag 72 using their claws 14 and legs 16, as shown in FIG. 2 of the drawings.

Once a crab(s) 12 enters the crab trap 10 to eat the bait 96 in the tensioned bait bag 72, the center frame 42 is moved which causes the main fishing line 98 to move and jiggle, such that the user feels the jiggling movement of the tensioned line 98 (as one would feel when fishing). The main fishing line 98 is then pulled up in the direction of arrow B. which causes the outer frame members 22 and 32 to pivot inwardly and close, and the claws 14 and legs 16 of crab(s) 12 are ensnared and trapped within crab net 70. This action entraps the crabs 12 within the crab trap 10. The nylon line 98 is then further pulled up in direction B, which will then pull the crab trap 10 out of the ocean water.

The crabs 12 are then removed from the crab trap 10 by opening hinge springs 58 and 60 to their open position, giving access to the crabs 12 for removal from the net 70 thereof. The bait bag 72 can be emptied or reloaded with bait 96 for reuse.

After the crabbing is completed, the crab trap 10 and bait bag 72 are easily moved to their collapsed configuration by closing hinge springs 58 and 60 on center hinge 52, as depicted in FIG. 3 of the drawings. With the crab trap 10 in its closed or collapsed state, it is compact and flat and can be easily transported and stored.

ADVANTAGES OF THE PRESENT INVENTION

Accordingly, an advantage of the present invention is that it provides for a foldable crab trap having a bait bag which in an operational mode includes a simple and direct signalling device for indicating when a crab has entered the trap and is eating the bait so the user can immediately close the trap and pull it up.

Another advantage of the present invention is that it provides for a foldable crab trap having a bait bag mounted on a frame under tension which provides the signalling device for indicating that a crab has entered the trap and is nibbling on the bait.

Another advantage of the present invention is that it provides for a foldable crab trap that is easily folded and collapsed for transport and storage, and having no loose pieces in its collapsed state.

A further advantage of the present invention is that it provides for a foldable crab trap that can be moved to an operational mode from a folded state to an open state by simply unfolding the outer frame members and inserting bait in the bait bag.

A still further advantage of the present invention is that it provides for a foldable crab trap having a bait bag that can be mass produced in an automated and economical manner; and is readily affordable to the user.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A foldable crab trap for catching crabs, comprising:

a) a central hinge member, and a central frame member having an inner end and an outer end, said inner end being connected to said central hinge member;

b) a pair of outer frame members each having crab nets and each connected at an inner end thereof to said central hinge member, and each having outer ends, said outer frame members being movable relative to said central hinge member between an open position wherein said outer frame members are in the same plane for receiving crabs, and a closed position wherein said outer frame members are parallel to each other for trapping the crabs;

c) spring means on said central hinge member for mounting said outer frame members in said open position for receiving crabs;

d) a tension line connected to the outer ends of said outer frame members and to the outer end of said central frame member for moving said outer frame members to said closed position, said tension line having a free end adapted to be held under tension for signalling when a crab is present in said crab trap;

e) bait means for containing bait and being connected under tension means to said central frame member; said tension means includes a Y-shaped upper tension line having two upper tying sections for attachment to said central frame member, and a lower tying section for attachment to said bait means; so that when a crab nibbles on said bait means it causes movement of said central frame member and movement of said tension line to signal that a crab is present in said crab trap, and so that said tension line may be used for moving said outer frame members to said closed position and for lifting said crab trap out of the water.

2. A crab trap in accordance with claim 1, wherein said center hinge member is a cylindrical metal or plastic bar having threaded ends.

3. A crab trap in accordance with claim 1, wherein said central frame member is U-shaped and is made of corrosion-resistant metal or plastic.

4. A crab trap in accordance with claim 1, wherein said inner end of said central frame member has attachment loops for connecting to said center hinge member.

5. A crab trap in accordance with claim 1, wherein said outer end of said central frame member has a tension loop for receiving said tension line.

6. A crab trap in accordance with claim 1, wherein said outer end of said central frame member includes a plurality of bait tension loops for receiving said tension means of said bait means.

7. A crab trap in accordance with claim 1, wherein each of said outer frame members is U-shaped and is made of corrosion-resistant metal or plastic.

8. A crab trap in accordance with claim 1, wherein said inner end of each of said outer frame members includes attachment loops for connecting to said center hinge member.

9. A crab trap in accordance with claim 1, wherein said outer end of each of said outer frame members has a tension loop for receiving said tension line.

10. A crab trap in accordance with claim 1, wherein said crab nets are made from fabric materials including nylon, cotton, hemp, polyester, or rayon.

11. A crab trap in accordance with claim 1, wherein said crab nets are made of a single sheet of crab net material covering both of said outer frame members.

12. A crab trap in accordance with claim 1, wherein said bait means includes a bait bag, a bait pouch, or a bait cage.

13. A crab trap in accordance with claim 12, wherein said bait bag is made from fabric materials including nylon, cotton, hemp, polyester, or rayon.

14. A crab trap in accordance with claim 1, wherein said tension means further includes a lower tension line having attachment loops at both ends, one end for attaching to said center hinge and the other end for attaching to said bait means.

15. A crab trap in accordance with claim 1, wherein said upper tension line can be made of fabric material including nylon, rayon, cotton or polyester.

16. A crab trap in accordance with claim 14, wherein said lower tension line can be made of fabric material including nylon, rayon, cotton or polyester or plastic wire or corrosion resistant metal wire.

* * * * *